INVENTOR.
BERT H. DANN
BY
Christie, Parker & Hale
ATTORNEYS

United States Patent Office 3,532,811

Patented Oct. 6, 1970

3,532,811

CIRCUIT FOR SEPARATING SYNC SIGNALS FROM A COMPOSITE VIDEO SIGNAL

Bert H. Dann, Altadena, Calif., assignor to Bell & Howell Company, Chicago, Ill., a corporation of Illinois Filed Mar. 29, 1968, Ser. No. 717,164
Int. Cl. H04n 5/08
U.S. Cl. 178—7.3 10 Claims

ABSTRACT OF THE DISCLOSURE

There is described a circuit which separates the horizontal and vertical sync pulses from a composite video signal. The operation of the circuit is based on the fact that the time the video signal is at sync tip level during one field is fixed in relation to the total time of one field in a standardized television broadcast signal. A capacitor is arranged to be charged from a first current source and discharged by a second current source, the source having effectively constant current and the currents being in the same ratio as the ratio of the time the video signal is not at sync tip level to the time the video signal is at sync tip level. The voltage across the capacitor controls the turning on and turning off of an output transistor in synchronism with the sync tips of the composite video input signal.

BACKGROUND OF THE INVENTION

In any television receiver, it is necessary to derive control pulses in time synchronism with the horizontal sync tips of the composite video signal. This is usually accomplished by restoring the sync tips of the composite video signal to some predetermined DC level and then applying the composite signal to some type of amplitude comparator circuit. The comparator circuit provides an output when the composite signal exceeds a predetermined level, which occurs only during the sync tip intervals. The circuit of the present invention has the advantage that it does not require any DC restoration and, in fact, is not affected by the presence of a small DC component on the video input. The circuit is unaffected by the nature of the external load and the input can be made with a very large input impedance so that it can be readily bridged across a standard 75 ohm video line without disturbing the operation of the circuit. The circuit is greatly simplified, limiting the number of circuit elements required, and none of the circuit elements are critical in their value.

SUMMARY OF THE INVENTION

The circuit of the present invention comprises a capacitor which is charged through a first resistor and first transistor from a potential source and discharged through a second resistor and second transistor from the same potential source. The resistance values have approximately the same ratio as the ratio of non-sync tip time to sync tip time in a complete field of the standard composite video signal. Alternate charging and discharging of the capacitor is controlled by a pair of transistors having their emitters connected respectively to the two terminals of the capacitor. The composite signal is AC coupled to the base of one transistor. The base of the other transistor is connected to a fixed reference potential, while the collector is connected through a load resistor to said potential source. By this arrangement, one transistor is turned on and one turned off only during sync tips, so that an output pulse can be derived across the load resistor with each sync tip regardless of changes in the DC component of the composite signal due to changes in the luminance level of the video signal.

DESCRIPTION OF THE DRAWING

For a better understanding of the invention, reference should be had to the accompanying drawing wherein.

DETAILED DESCRIPTION OF THE PREFERRED EMBODIMENT OF THE INVENTION

Figure 1:
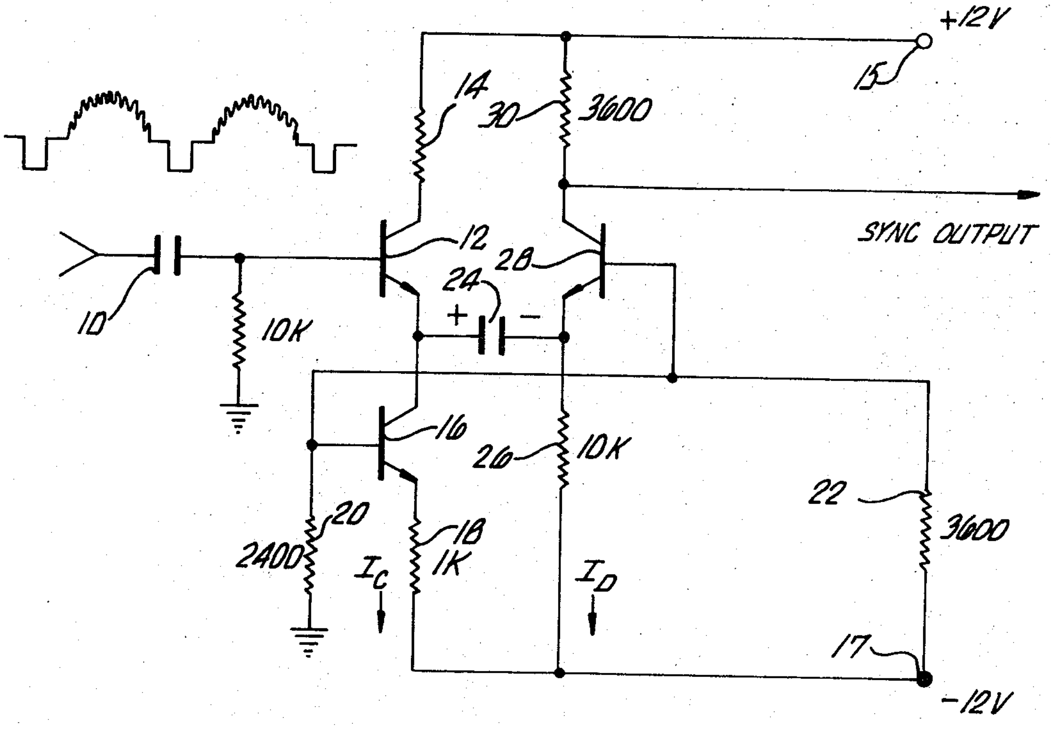
FIG. 1 is a schematic diagram of one embodiment of the present invention.

Referring to FIG. 1 in detail, a composite video signal having negative-going sync tips is coupled through a capacitor 10 to the base of a first transistor 12. The input signal, as shown, is a standard composite video signal with negative-going sync tips and positive-going white peaks and with a peak-to-peak amplitude of the order of 1 volt. The collector of the transistor 12 is connected through a small resistor 14 to the positive terminal 15 of a potential source (not shown). The resistor 14 is not essential to the operation of the circuit and may be eliminated, but is normally included to suppress any parasitic effects in the circuit.

The emitter of the transistor 12 is connected to a constant current source comprising a transistor 16 connected to the negative terminal 17 of the potential source through an emitter resistor 18. The base of the transistor 16 is tied to a fixed reference potential at the junction between resistors 20 and 22 forming a voltage divider between ground and the negative supply terminal 17. The collector current of the transistor 16 is substantially constant regardless of normal changes in the potential of the collector.

The emitter of the transistor 12 is also connected to one end of a capacitor 24, the other end of which is connected through a resistor 26 to the negative terminal of the potential source. The resistor 26 forms the emitter resistance of a transistor 28. The collector of the transistor 28 is connected through a load resistor 30 to the positive terminal of the potential source. The base of the transistor 30 is connected to the junction between the resistors 20 and 22 to provide a fixed reference potential on the base. The output signal, corresponding to the horizontal and vertical sync pulses, is derived at the junction between the load resistor 30 and the collector of the transistor 28.

In operation, with no input signal, the base of the transistor 12 is normally at ground potential and the transistor 12 is conductive. The transistor 28 also will be conducting. The capacitor 24 will charge to a particular voltage determined by the difference in potential at the emitter of the transistor 12 (approximately ground) and the potential at the emitter of transistor 28 (approximately —5 v.). During sync tip time of the input signal, the transistor 12 is cut off, and the capacitor 24 discharges through transistor 16 and resistor 18 at a constant current rate. When the input signal swings more positive at the trailing edge of the sync tips, it turns on the transistor 12, raising the potential at the emitter of the transistor 28 sufficiently to cut off the transistor 28. The capacitor 24 now is charged through the resistor 26. It should be noted that the resistor 26 acts as a substantially constant current source because voltage drop across the resistor 26 is quite large compared to the voltage change at the emitter of transistor 12 during the charging interval. However, a transistor could be interposed between the resistor 26 and capacitor 24, if desired, to insure a linear charging rate.

Since the average or DC current through the capacitor must be zero, the net charge accumulated during charging time must equal the net charge dissipated during discharging time when averaged over a period of time, such as one complete field or longer. To assure that the transistor 28 conducts only during the time the video signal is at the sync tip level, the ratio of the charging current to the discharging current must be the same as the ratio of the time the input signal is not at sync level to the time the input signal is at sync level during one field. This may be expressed by the following equation:

$$\frac{I_C}{I_D}=\frac{t_v}{t_s}$$

where $I_C$ is the charging current (as fixed by transistor 16 through resistor 18), $I_D$ is the discharging current (through resistor 26), $t_V$ is the time during one field (or longer period) that the input signal is not at sync tip level, and $t_S$ is the time the input signal is at sync tip level during the same period. For standard U.S. television signals, the ratio $t_V/t_S$ is .912/.088 for a complete field, or approximately 10.4.

Since the charging current is determined by the size of the resistor 26, while the discharging current is determined by the size of the resistor 18, the resistors 26 and 18 should be in the ratio of 10.4:1. In practice, a ratio of 10:1 is satisfactory. The capacitor, in practice, is made just large enough that the voltage across it does not change more than 20 to 50 millivolts during the vertical blanking interval. If the capacitor is made larger than this, the circuit becomes susceptible to low-frequency transients such as may occur during scene changes.

Figure 2:
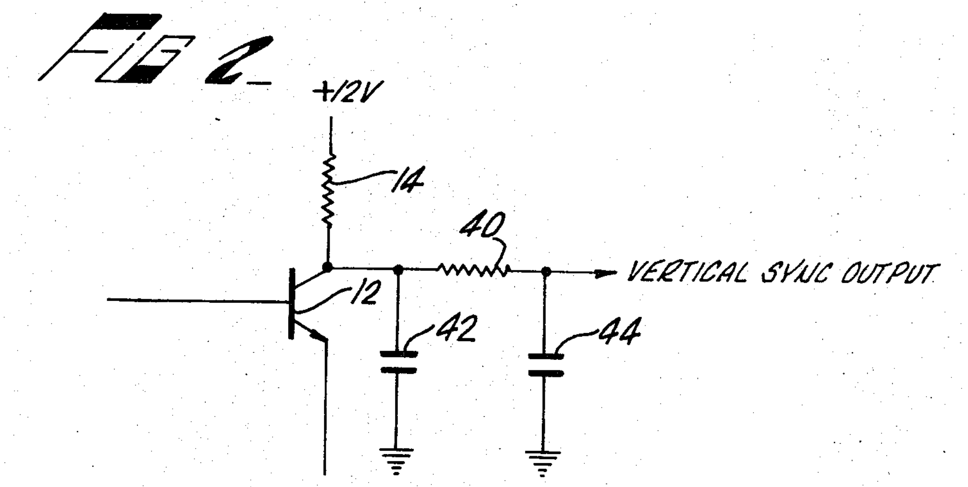
FIG. 2 shows a modification of the circuit of FIG. 1.

FIG. 2 shows a modification to the circuit of FIG. 1 in which vertical sync pulses are also derived by means of an integrator circuit consisting of a series resistor 40 and shunt capacitors 42 and 44. The circuit is otherwise the same as FIG. 1. The integrator is connected to the collector of the transistor 12. Because the transistors 12 and 28 conduct alternately, an output at the collector of the transistor 12 has the same waveform but opposite polarity to the output at the collector of transistor 28. The integrator output provides a pulse at vertical sync time due to the longer duration of the vertical sync pulses in the composite input signal, which turns off the transistor 12 for longer portions of each sync interval.

What is claimed is:

1. A sync separating circuit for deriving sync signals from the sync tips of a composite video input signal, comprising a capacitor, first and second current sources, first switch means for connecting the capacitor across a first constant current source, second switch means for connecting the capacitor across a second constant current source, said first and second switch means and current sources being connected to reverse the direction of current through the capacitor from the respective sources, control means responsive to the composite signal for alternately closing one or the other of said switch means, said control means closing one switch means only during the sync tips, the two current sources having a ratio of current equal to the ratio of the time the video signal is not at sync tip level to the time the video signal is at sync tip level, and means for deriving an output signal in response to current flow from one of said sources.

2. Apparatus as defined in claim 1 wherein the two current sources comprise a single potential source and a separate resistor in series with the source, the resistors of the two current sources having a resistance ratio equal to the ratio of the time the video signal is not at sync tip level to the time the video signal is at sync tip level.

3. Apparatus as defined in claim 1 wherein each of the switching means includes a transistor, the capacitor being connected between the emitters of said transistors and the current sources being coupled to the respective collectors of the transistors.

4. Apparatus as defined in claim 3 wherein resistance means connects the collectors respectively to a common junction with the two current sources.

5. Apparatus as defined in claim 4 wherein a capacitor coupled the composite video input signal to the base of the first transistor, and the base of the second transistor is connected to a fixed reference potential.

6. Apparatus as defined in claim 4 further including an integrating circuit connected to the collector of the first transistor to provide an output in response to the vertical snyc portion of the composite video signal.

7. A sync separating circuit for deriving sync signals from the sync tips of a composite video input signal, comprising a capacitor, a first constant current source, a second constant current source, the two constant current sources having a ratio of current equal to the ratio of the time the composite video signal is not at sync tip level to the time the signal is at sync tip level during a complete field, first transistor switch means for connecting the capacitor across the first current source, second transistor switch means for connecting the capacitor across the second current source, the relative polarity of the sources being such that current flow at the capacitor is reversed, the composite signal being coupled to the first transistor.

8. A sync stripping circuit for separating a sync signal from a composite video input signal, comprising first and second transistors, means connecting the collectors of the transistors to one end of a potential source, constant current means including a first resistor connecting the emitter of the first transistor to the other end of the potential source, means coupling the composite video signal to the base of the first transistor, means including a second resistor connecting the emitter of the second transistor to said other end of the potential source, means for holding the base of the second transistor at a fixed potential, a capacitor connected between the emitters of the two transistors, the first and second resistors being substantially in the same ratio as the time the video input signal is at sync tip level to the time the input signal is not at sync tip level.

9. Apparatus as defined in claim 8 wherein the second resistor is of the order of ten times the value of the first resistor.

10. Apparatus as defined in claim 8 wherein a load resistor connects the collector of the first transistor to one end of the potential source, and an integrating network is connected to the collector of the first transistor to integrate the voltage changes across said load resistor.

References Cited

UNITED STATES PATENTS 3,006,996 10/1961 Isabeau ............ 178—7.3

RICHARD MURRAY, Primary Examiner

R. L. RICHARDSON, Assistant Examiner